106. COMPOSITIONS, COATING OR PLASTIC.
75 Patented Feb. 4, 1936

2,029,311

UNITED STATES PATENT OFFICE 2,029,311

INSULATING MATERIAL

Nathaniel M. Elias, New York, N. Y.

No Drawing. Application September 26, 1930,
Serial No. 484,700

3 Claims. (106-122)

The present invention relates to an improved plastic or thermoplastic insulating sound-proofing and structural material and to a process for its manufacture. The present invention may also be employed in the production of finished structures where the qualities of the product are desiderata as in the production of refrigerator cabinets, aeroplane bodies, partition walls, and various articles such as furniture or the like. It is useful particularly as it provides the possibility of both thermal and sound insulation in such structures.

It is the object of the present invention to provide a structural material of the type described and which though light in weight has a high mechanical strength and may therefore be employed in the construction of the type of article described.

The invention, therefore, contemplates the combination of an insulating material, which generally on account of its cellular structure has a low mechanical strength with a plastic, thermoplastic or other binding or impregnating material which lends the desired mechanical strength to the product, and may also if desired form a finished surface that is suitable for the finished article as well as serving as a binder for the insulating material.

The invention, therefore, is best exemplified by the combination of a mineral insulating material with a plastic material which may be cast either hot or cold, or may be molded either hot or cold and forming them to the desired shape.

Among the insulating materials which may be employed are included masses of rock or mineral wool, insulating silicate pellets, insulating alkali silicate-borate pellets, blocks of insulating alkali silicate or of alkali silicate-borate, asbestos fibres in small insulating masses, asbestos-magnesia in small insulating masses, kieselguhr in small pieces or in blocks, fuller's earth compressed into small pieces, or other similar materials having high insulating properties. Such materials have in common the property of having a specific gravity less than unity.

The insulating material used, whether in small pieces or in blocks, must contain, incorporated in it, a sufficient volume of air in the cells to provide good insulating qualities. Such materials also give desirable sound insulating and absorbing properties.

The plastic substance may also be any of a variety of substances. It may be simply a cementitious substance which may be cast cold, or a metal, as for example aluminum, which may be melted and cast, or it may be a thermoplastic of the type of phenol formaldehyde resin, resin, shellac, or rubber, or a mixture or combination of the same phthalic anhydride polyhydroxy alcohol resin.

In carrying out the process either the pellets of insulating material are incorporated into the plastic mass or blocks of the insulating material are set up in approximately the form desired and the plastic mass molded around it in suitable molds. The binding material holding the blocks or pellets together may be different from that used for surfacing the finished article.

In the case of the thermoplastics, suitable temperatures and pressures are applied during the molding process, the particular temperature and pressure depending upon the thermoplastic used.

For example, a mass of insulating pellets is mixed with a powdered resin of the phenol-formaldehyde resin or phthalic anhydride polyhydroxy alcohol resin type and molded direct in a mold designed to produce a complete icebox under suitable temperature and pressure. This avoids the necessity of any finish being applied to the outside of the icebox.

Similarly rubber may be used for the same purpose.

An alternative method is to place blocks of the insulating material in the center of the mold and then mold the thermoplastic or other material around it so that the resultant structure is lined with insulating material wherever necessary.

An example of use of the blocks in this way is the use of an alkali silicate or alkili silicate borate block as the insulation material. This may be constructed in the form of the inside of an icebox wall for example. Then a layer of a suitable raw rubber-sulphur compound may be coated on both the inside and outside of the structure either before it is placed in the mold or during the time it is there and the entire ice box may be molded, under suitable temperature and pressure, in one piece, giving a hard rubber surface on the outside and inside thoroughly bonded to the lining of insulating material, the hard rubber furnishing the principal mechanical strength, as well as the finish of the article.

In supporting such blocks in the center of the mold small plugs of the hardened plastic material may be used which are left in the finished wall making a completely homogeneous surface.

When pellets of the insulating material are used they may vary considerably in size depending on the properties desired in the finished product. For example, where very thin objects are to be made, pellets must be used sufficiently small so that the mechanical characteristics of the finished article are satisfactory, that is, so that a sufficient amount of the thermoplastic is present to furnish the desired amount of mechanical strength.

In the case of making metal furniture it is necessary to keep the mass of metal and insulating material thoroughly agitated during the preparation for pouring, as the specific gravity of the insulating material is usually lower than that of the metal. Similarly the temperature of the melted metal should be kept as low as possible to produce a satisfactory casting so that the pellets of insulating material will not have an opportunity of separating out in the mold, before the metal solidifies.

In using the insulating blocks with metal the block may be held in place by strips of the same metal which is used and this may then be left in place. Or a different metal of a higher melting point may be used to hold the block in place.

While many metals may be used for this process, I have found aluminum and aluminum magnesium alloys and other aluminum alloys to be particularly suitable for use in this manner.

In the use of such a combination of insulator and cementitious material it has also been found possible to produce the product directly in the place where it is used. That is, pellets of insulating material are mixed with cement or plaster and cast in place, or blocks of the insulator are put in place and the cementitious material poured around them. This method is alternative to making blocks of pellets and cementitious material of various shapes which can be used in structural work, or of making plaster or cement coated insulating material as structural units.

It is, of course, evident that such cementitious material may be reinforced with suitable metallic or other reinforcing material.

Blocks of the various insulating material may be coated with metal by dipping them into melted metal maintained at a temperature such that as the block is withdrawn a coating adheres. In the case of some insulators the melted metal will be absorbed for some distance into the interior of the block. In the case of others it will form simply on the surface. Such metal-coated insulation may be used in a variety of ways for insulating and structural work. An alternative way of producing such products is to spray the insulator with the molten metal, whereby it may be completely or only partly coated.

It will be seen that by the process disclosed herein a product is produced having heat insulating qualities and also having the desired mechanical strength so that it may be used in the manufacture of a large variety of finished products.

While by the use of this process an article may be produced which has a finished appearance, it will be understood that, if it is desired, the nature of the surface may be altered or ornamented by the application of any desired type of coating or paint or lacquer. The surface may also be coated with metal, hard rubber, celluloid, phenol-formaldehyde resin, or other thermoplastic material, wood or any other surfacing material regardless of the type of binding material used to hold the structure together.

Where the nature of the binding material used permits it, the insulation may comprise or consist of cork in granulated or block form.

The term "cellular" appearing in this specification and in the appended claims defines masses or pellets which contain air; the masses or pellets being so formed that the plastic material does not displace the air contents of the masses or pellets and does not seriously affect the insulating value of the same.

What is claimed is:—

1. A new article of manufacture comprising a mass of cellular insulating material having a specific gravity less than unity, and metal serving as a binder for said insulating material and forming a coating or lining for the mass to constitute a finished surface for the article.

2. A new article of manufacture comprising a mass of cellular insulating material in subdivided form having a specific gravity less than unity, and metal serving as a binder for said insulating material and forming a coating or lining for the mass to constitute a finished surface for the article.

3. A new article of manufacture comprising a plurality of blocks of cellular insulating material having a specific gravity less than unity and metal serving as a binder for said insulating material and forming a coating or lining for the mass to constitute a finished surface for the article.

NATHANIEL M. ELIAS.